(No Model.)
O. B. OLMSTED.
DEVICE FOR PUNCHING METALLIC TUBES.
No. 252,247. Patented Jan. 10, 1882.
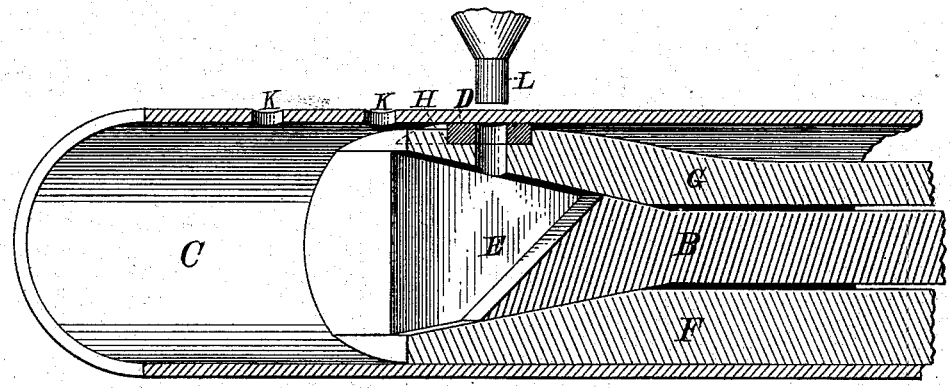

UNITED STATES PATENT OFFICE.

OSCAR B. OLMSTED, OF BELOIT, WISCONSIN.

DEVICE FOR PUNCHING METALLIC TUBES.

SPECIFICATION forming part of Letters Patent No. 252,247, dated January 10, 1882.

Application filed July 7, 1881. (No model.)

*To all whom it may concern:*

Be it known that I, OSCAR B. OLMSTED, a citizen of the United States, residing at Beloit, in the county of Rock and State of Wisconsin, have invented certain new and useful Improvements in Mandrels and Dies for Punching Pipe, of which the following is a specification.

My invention relates to improvements in dies and mandrels for punching pipe, in which a die and mandrel are placed inside the pipe in such a way as to fill the inside of the pipe directly under the punch while the hole is being punched; and the objects of my improvements are to provide a die and mandrel that will fill the pipe and prevent the pipe from being crushed in while being punched, and that can be easily and cheaply replaced when worn out by use. I attain these objects by the mechanism illustrated in the accompanying drawing, which is a sectional view of the mandrel, die, and pipe.

Similar letters refer to similar parts.

The mandrel is in three parts, G B F. The center piece, B, which should be made of steel, is wedge-shaped at the end directly under the die D, and is provided with a slot-opening, E, to allow the metal cut away while punching to drop out. The lower piece, F, of the mandrel is convex on the under side, with its upper face flat and inclined to fit the lower face of the center piece, B. The top piece, G, is provided with a recess, H, for holding the die D in its proper place inside the pipe C under the punch L. The die D is convex on the upper side to fit the inside of the pipe to be punched, and is flat on its under side to fit the recess H. It is also provided with a hole through it vertically, directly under the punch, to allow the metal cut out in punching to pass through it and out at the slot in the wedge B.

In working my invention the mandrel and die are placed in a suitable punching-machine, and the wedge B is worked back and forth by any suitable mechanism, and the die and mandrel are alternately tightened in the pipe while the punch is being forced through it, and loosened to allow the pipe to be moved along for another hole to be punched.

I am aware that prior to my invention, as herein described, mandrels in three parts have been used in pipe-punching machines, in which the upper piece of the mandrel was so constructed as to form the die; but the great objection to that form of mandrel and die is its liability to soon wear out in use and the great expense of repairing or replacing with a new one.

What I do claim as my invention, and desire to secure by Letters Patent, is—

The combination, in pipe-punching machines, of the die D with the expanding mandrel G B F, substantially as described, for the purposes specified.

OSCAR B. OLMSTED.

Witnesses:
 J. B. DOW,
 T. P. GRAY.